United States Patent [19]

Yoshida

[11] Patent Number: 5,066,347
[45] Date of Patent: Nov. 19, 1991

[54] TAPE TRANSPORT APPARATUS AND METHOD OF INTRODUCING TAPE THERETO

[75] Inventor: Hirokazu Yoshida, Tokyo, Japan

[73] Assignee: Otari Electric Co. Ltd., Japan

[21] Appl. No.: 217,568

[22] Filed: Jul. 11, 1988

[30] Foreign Application Priority Data

Jul. 11, 1987 [JP] Japan .................. 62-173399

[51] Int. Cl.$^5$ .................. B31F 5/06; B65H 69/06
[52] U.S. Cl. .................. 156/159; 156/304.3; 156/505; 242/58.1
[58] Field of Search .................. 156/159, 304.3, 502, 156/505; 242/58.1, 197

[56] References Cited

U.S. PATENT DOCUMENTS

| | | | |
|---|---|---|---|
| 4,213,159 | 7/1980 | King | 360/16 |
| 4,501,630 | 2/1985 | Kiuchi | 156/304.3 |
| 4,609,422 | 9/1986 | Becking | 156/502 |
| 4,656,530 | 4/1987 | Farrow et al. | 360/15 |
| 4,727,442 | 2/1988 | Clark | 360/71 |

FOREIGN PATENT DOCUMENTS

44-20676 4/1969 Japan .
48-44314 of 1973 Japan .

Primary Examiner—Michael Wityshyn
Attorney, Agent, or Firm—Brumbaugh, Graves, Donohue & Raymond

[57] ABSTRACT

The present invention relates to a tape transport apparatus and a tape introduction method for forming a magnetic tape into an endless loop by splicing a leader tape to the magnetic tape and running such endless-loop magnetic tape therein. When an endless loop is shaped by splicing the magnetic tape and the leader tape to each other, the starting (front) end of the magnetic tape is drawn out to a splicing position while the front (fore) end of the leader tape is also brought thereto and, after the respective ends are spliced together, the endless loop is moved until the spliced portion between the magnetic tape and the leader tape is shifted to the splicing position for the leader tape. The starting front end of the magnetic tape led by such leader tape is then spliced to the terminal rear end of the magnetic tape, so that an endless loop is formed automatically without the necessity of the performance of operation by hand upon the magnetic tape.

7 Claims, 4 Drawing Sheets

TAPE TRANSPORT APPARATUS AND METHOD OF INTRODUCING TAPE THERETO

BACKGROUND OF THE INVENTION

1. Field of the Invention

The present invention relates to a tape transport apparatus for forming a magnetic tape into an endless loop and running the same continuously, and also to a method of introducing a tape to such transport apparatus.

2. Description of the Prior Art

For efficient mass reproduction of magnetic tapes in general, it is necessary that the master (mother-print) magnetic tape from which the copies are made be an endless-loop tape which runs continuously. Relative to the apparatus developed heretofore for continuously running such master tapes, some examples are known as disclosed in Japanese Utility Model Laid-open No. 48 (1973)-44314, Japanese Patent Publication No. 44 (1969)-20676, and U.S. Pat. Nos. 4,213,159 and 4,656,430. Any of such conventional tape transport apparatus is equipped with a loop bin for housing a master tape while leaving it in an elongated meandering state without winding, wherein the starting (front) end and the terminal (rear) end of such magnetic tape are spliced to each other to form an endless loop which is then housed in the loop bin so that the tape may be run continuously.

When the magnetic tape is loaded in such conventional tape transport apparatus, it is necessary to draw out the magnetic tape from a supply reel and to splice its front and rear ends to each other to form an endless loop, and the operator needs to perform these steps manually. Therefore, during the above operation, it is unavoidable that the operator's fingers come into direct contact with the surface of the master magnetic tape, hence contaminating the tape surface due to the contact of the fingers. The contamination can cause a problem of dropout on the reproduced magnetic tape. Although the cause of such dropouts is obvious, it has been extremely difficult heretofore to completely prevent undesired contact of fingers and thus it is extremely difficult to eliminate such contamination of the master tape.

SUMMARY OF THE INVENTION

An improved tape transport apparatus is provided which is adapted for forming a magnetic tape into an endless loop without direct contact of an operator's hand therewith and for loading such endless loop to permit duplication thereof, and also in providing a method of introducing a tape into such tape transport apparatus.

Firstly, for forming a magnetic tape into an endless loop and running the same continuously, the apparatus of the invention comprises a reel means for supplying the magnetic tape, a loop housing means for housing the magnetic tape supplied from the reel means, a means for housing a leader tape, and a means for splicing the leader tape and the magnetic tape to each other.

Secondly, in the apparatus mentioned above, the splicing means is adapted for splicing the front end of the magnetic tape to that of the leader tape, and also for splicing the front end of the magnetic tape to the rear end of the magnetic tape.

And thirdly, for introducing the magnetic tape into such tape transport apparatus of the above constitution, the method of the present invention comprises a step of housing the leader tape in the loop housing means, a step of splicing the front end of the leader tape in the loop housing means to the front end of the magnetic tape drawn out from the reel means, a step of withdrawing the leader tape from the loop housing means and storing the leader tape in the leader-tape housing means, a step of introducing the magnetic tape into the loop housing means in response to withdrawal of the leader tape from the loop housing means, and a step of splicing the front end of the magnetic tape to the rear end of the magnetic tape after the magnetic tape is housed in the loop housing means, thereby forming the magnetic tape into an endless loop.

In the tape transport apparatus and the tape introduction method of the present invention just described, the front end of the magnetic tape to be supplied from the reel means is drawn out therefrom and then is guided up to the splicing means, while the front end of the leader tape supplied from the leader-tape housing means is drawn out therefrom and then is guided through the loop housing means and through the splicing means so as to be juxtaposed with the front end of the magnetic tape. The front end of the magnetic tape and the front end of the leader tape are spliced to each other by the splicing means, and the leader tape is drawn back into the leader-tape housing means so as to be housed therein. As a result of the magnetic tape being supplied from the reel means and pulled by leader tape, the loop housing means is filled with the magnetic tape. The pulling of the leader is ceased when the front end of the magnetic tape has been pulled up to the splicing means after having passed through the loop housing means. The rotation of the reel means is ceased when the enough magnetic tape has entered the loop housing means that the rear end of the magnetic tape has reached the splicing means. Next the front end of the leader tape and the front end of the magnetic tape are cut to be separated. Finally, the front and rear ends of the magnetic tape are spliced to each other by the splicing means, and as a result the magnetic tape constitutes an endless loop in the tape transport apparatus.

DESCRIPTION OF THE PREFERRED EMBODIMENTS

Figure 1:
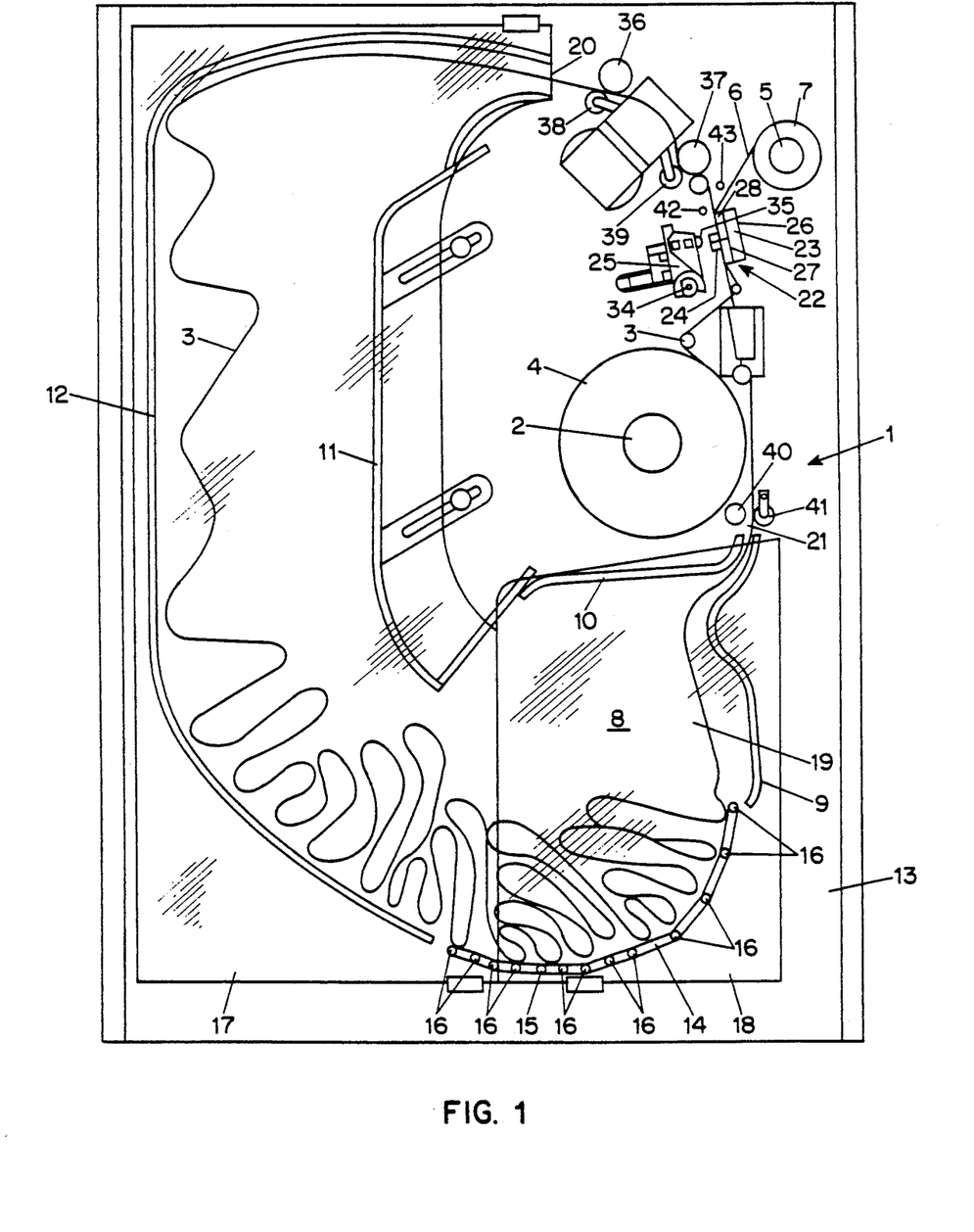
FIG. 1 is a front view of an exemplary tape transport apparatus embodying the present invention.

Hereinafter an exemplary embodiment of the present invention will be described in detail with reference to the accompanying drawings. Reference numeral 1 denotes a tape transport apparatus, wherein a first reel means 2 corresponds to the aforementioned reel means for supplying a magnetic tape 3 therefrom and has an unshown motor for winding the magnetic tape 3 by rotationally driving a reel 4. Denoted by 5 is a second reel means corresponding to the aforesaid leader-tape housing means where a leader tape 6 for leading the magnetic tape 3 is housed, and having an unshown motor for rotationally driving a leader tape reel 7 around which the leader tape 6 is wound.

Also shown is a loop bin 8 which corresponds to the aforesaid loop housing means adapted to house the magnetic tape 3 in an elongated meandering state without winding the same, and guide rails 9, 10, 11, 12 for guiding the magnetic tape 3 are disposed in the loop bin 8. Such guide rails 9, 10, 11 and 12 are arrayed on a front panel base 13 in the tape transport apparatus 1 and are so shaped as to protrude from the panel base 13 by a distance slightly greater than the width of the magnetic tape 3, whereby the magnetic tape 3 is rendered freely movable in the loop bin 8 while being kept in a vertical posture, that is, at all times perpendicular to the base 13. A tape feed belt 14 is disposed in a lower portion of the tape transport apparatus 1 and is engaged with at least one drive roller 15 and a multiplicity of guide rollers 16 for guiding the magnetic tape 3. Denoted by 17 and 18 are glass plates for closing the upper surface of a tape housing chamber 19 constituted of the guide rails 9, 10, 11, 12 and the tape feed belt 14. The loop bin 8 is constituted substantially of such guide rails 9, 10, 11, 12, panel base 13, tape feed belt 14 and glass plates 17, 18. An inlet 20 for passing both the magnetic tape 3 and the leader tape 6 therethrough is formed in the end portion between the guide rails 11 and 12, and a similar outlet 21 is formed in the end portion between the guide rails 9 and 10.

Figure 2A:
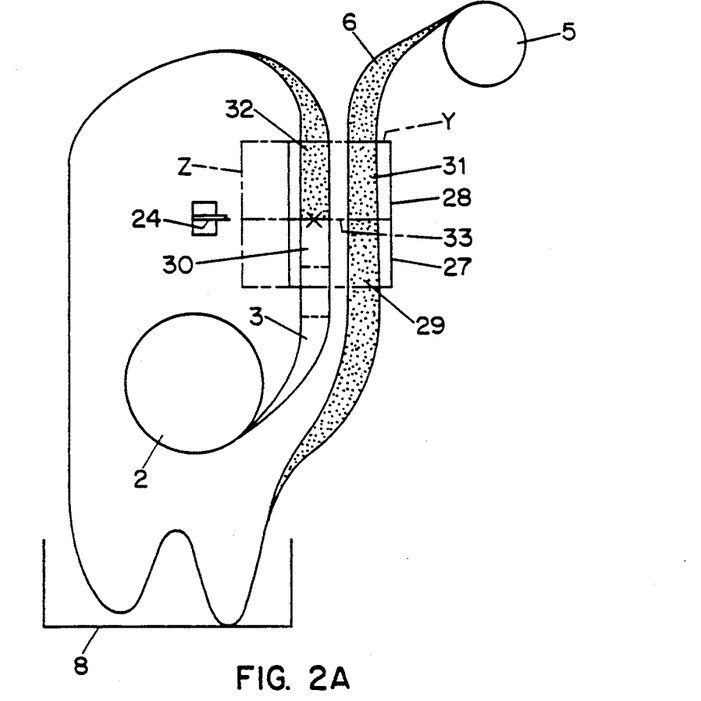
FIGS. 2A, 2B, 2C, 2D and 2E typically illustrate the operation of the apparatus shown in FIG. 1.

Reference numeral 22 denotes the aforesaid splicing means which consists of a splicing block 23, a cutter blade 24 and a tape splicer 25. The splicing block 23 comprises a slide block 26 anchored to the panel base 13, and a pair of slide guides 27 and 28 each slidable independently of the slide block 26. Such slide guides 27 and 28 respectively have two parallel guide grooves 29, 30 and 31, 32 as illustrated in FIG. 2A, and each of the guide grooves 29, 30, 31 and 32 is shaped to be shallow with a width sufficient to accommodate the magnetic tape 3 or the leader tape 6. The two slide guides 27 and 28 are so slidable that either of the guide grooves 29 or 30 in one slide guide 27 maybe selectively aligned with either of the grooves 31 and 32 in the other slide guide 28 to form a single groove. Furthermore, a multiplicity of small holes communicating with an unshown suction device such as a negative pressure source are bored in the bottom surfaces of the guide grooves 29, 30, 31 and 32 so as to hold the magnetic tape 3 or the leader tape 6 by suction when positioned in such grooves 29, 30, 31 and 32.

The cutter blade 24 is so actuated as to pass through a gap 33 between the slide guides 27 and 28 as illustrated in FIG. 2A and is capable of cutting the magnetic tape 3 or the leader tape 6 when held in the guide grooves 29, 30, 31 and 32 by suction.

The tape splicer 25 has a reel 34 around which an adhesive tape is wound, and is disposed on the panel base 13 in a manner to be shiftable toward or away from the splicing block 23. The tape splicer 25 is capable of first severing the adhesive tape, which is supplied from the reel 34, into a segment 35 of an adequate size by an unshown blade, then pushing out the segment 35 of the adhesive tape toward the splicing block 23, thereby at appropriate times splicing, by the use of such segment 35, the front end of the leader tape 6 to the front end of the magnetic tape 3 being retained in the splicing block 23, and at other appropriate times splicing the front end of the magnetic tape 3 to the rear end thereof.

Denoted by 36 and 37 are capstans rotationally driven by an unshown motor, and pinch rollers 38 and 39 are disposed opposite thereto respectively. Thus, between the capstan 37 and the pinch roller 39 constituting a pair, the magnetic tape 3 may be held and run counterclockwise. Shown at 40 is a capstan driven rotationally by an unshown motor and serving to run the magnetic tape 3 or the leader tape 6 clockwise in cooperation with a pinch roller 41 disposed opposite thereto.

There are further shown detection mechanisms 42 and 43 which are disposed opposite to each other on the panel base 13 with a space kept therebetween to permit passage of the magnetic tape 3 or the leader tape 6 and function to detect the position of the adhesive tape segment 35 used for splicing the magnetic tape 3 or the leader tape 6. Such detection mechanisms 42 and 43 may be a type that senses the reflection or transmission of light relative to the segment 35, or maybe a type that senses an unshown small hole formed in the tape at the time of splicing the same, or may be a type that reproduces a signal of an extremely low frequency recorded on the tape.

The operation performed in the present invention in the above-described embodiments will now be described with reference to FIGS. 2A through 2E where the tape transport apparatus 1 of FIG. 1 is typically shown. It is to be noted that in FIG. 1, the slide guides 27 and 28 are so illustrated as to be slidable along a line perpendicularly to the plane of the panel base 13. However, in FIGS. 2A through 2E, the sliding direction thereof is portrayed as parallel with such plane for facilitating the explanation.

First, FIG. 2A illustrates an initial stage of operation where the magnetic tape 3 supplied from first reel means 2 has not yet been formed into an endless loop. Although in this state the two slide guides 27 and 28 are at the positions indicated by a solid line Y, they are slidable independently of each other to the positions indicated by a dotted line Z. The cutter blade 24 is capable of passing through the gap 33 between the slide guides 27 and 28 and, if slide guides 27 and 28 are positioned as shown in the solid lines, will traverse the guide grooves 30 and 32. In the state of FIG. 2A, the entirety of the magnetic tape 3 is wound around the first reel means 2, and its front end, having been introduced into the guide groove 30, is held there by suction. The leader tape 6 supplied from the second reel means 5 has been passed through guide grooves 29, 31, through the outlet of the loop bin 8 and then is brought to the inlet thereof, and subsequently its fore end has been passed through in the guide groove 32 and held there by suction. The cutter blade 24 is actuated with slide guides 27, 28 in the positions shown in solid lines, and thus the cutter blade 24 traverses the guide grooves 30 and 32, thereby cutting uniformly the front end of the magnetic tape 3 and the front end of the leader tape 6.

Figure 2B:
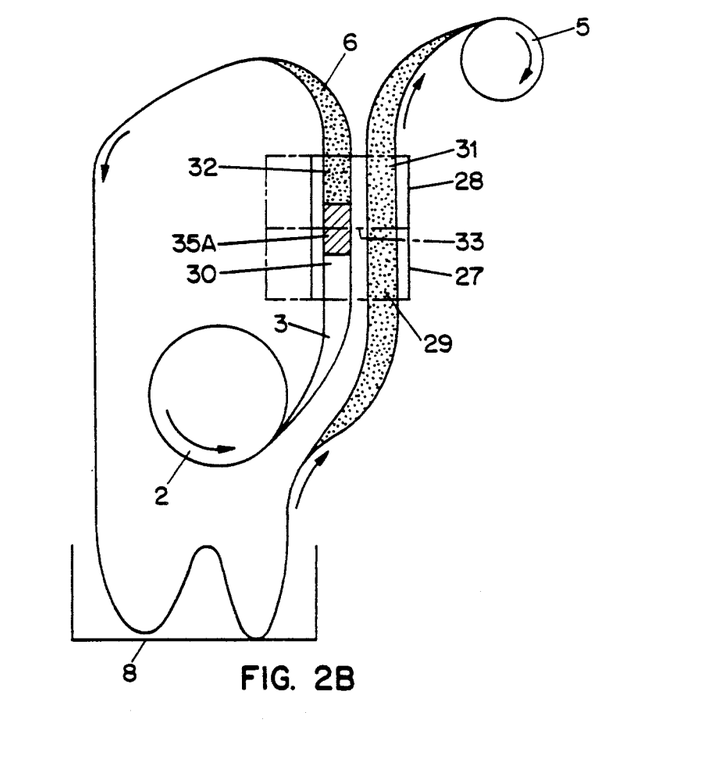

Thereafter, as illustrated in FIG. 2B, the tape splicer 25 shown in FIG. 1 is actuated to push a severed segment 35A of the adhesive tape toward the splicing block, whereby, where the front end of the magnetic tape 3 and the front end of the leader tape 6 are spliced to each other by the segment 35A. Next the suction of the guide grooves 29, 30, 31 and 32 is turned off, and as a result, both the magnetic tape 3 and the leader tape 6 are rendered freely movable in the guide grooves 29, 30, 31 and 32. With the suction turned off, the first reel means 2 is rotated counterclockwise to feed the magnetic tape 3 forward (counterclockwise), while the second reel means 5 is rotated clockwise to take up the leader tape 6. When the magnetic tape 3 is to be fed forward (counterclockwise), the capstans 36, 37 and the pinch rollers 38, 39 are driven in the correspondly appropriate directions.

In FIG. 2B, the magnetic tape 3 is fed into the loop bin 8 until the desired end point (rear end) of the magnetic tape 3 is positioned between the guide grooves 30 and 32. The leader tape 6 is taken up around the second reel means 5 until the front end of the magnetic tape 3 is positioned between the guide grooves 29 and 31.

Figure 2C:
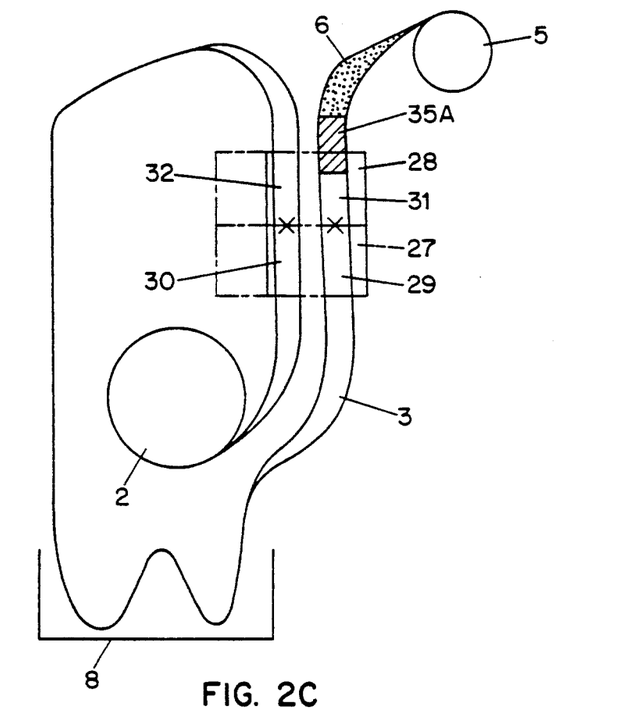

FIG. 2C illustrates the state of affairs at such time as desired length of the magnetic tape 3 has been fed into the loop bin 8 and the leader tape 6 has been withdrawn from the loop bin 8. When this has been accomplished, suction is turned on at the guide grooves 29, 30, 31 and 32. Then the cutter blade 24 is actuated to traverse the guide grooves 29, 30, 31 and 32, thereby cutting the magnetic tape 3 that is held there.

Figure 2D:
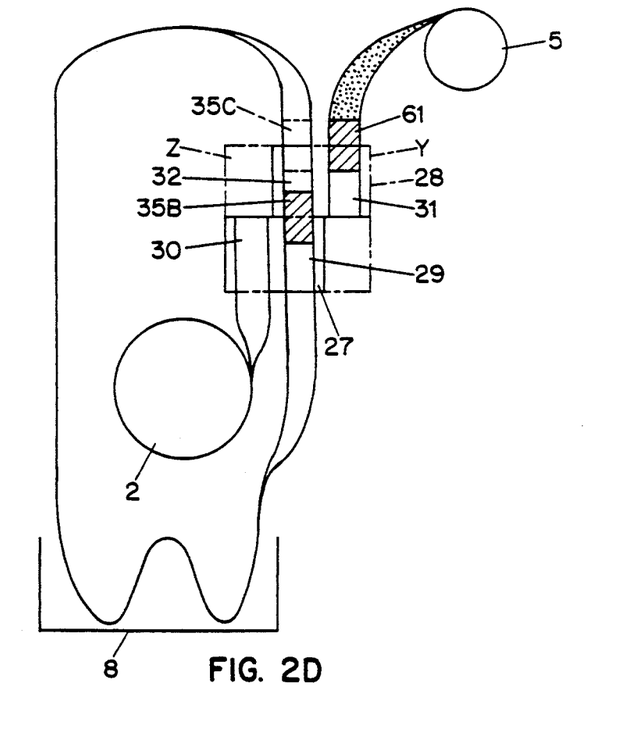

Subsequently, as illustrated in FIG. 2D, the slide guide 27 is shifted from the position Y to the position Z, so that the guide grooves 32 and 29 are aligned with each other to form a single groove, whereby the rear end of the magnetic tape 3 in the guide groove 32 is juxtaposed with the front end of the magnetic tape 3 in the guide groove 29 so as to permit splicing. The tape splicer 25 is again actuated, this time to splice the front and rear ends of the magnetic tape 3 to each other by using a severed segment 35B of the adhesive tape, and thereafter the suction at guide grooves 29 and 32 is turned off. In the manner just described the magnetic tape 3 is automatically formed into an endless loop by the splicing means 22, hence achieving complete elimination of direct contact of the operator's fingers with the magnetic tape 3. Consequently, it becomes possible to prevent contamination of the magnetic tape 3 that may otherwise be caused by the contact of the operator's fingers with the surface of the magnetic tape 3, thereby averting occurrence of dropout on the reproduced magnetic tapes.

Figure 2E:
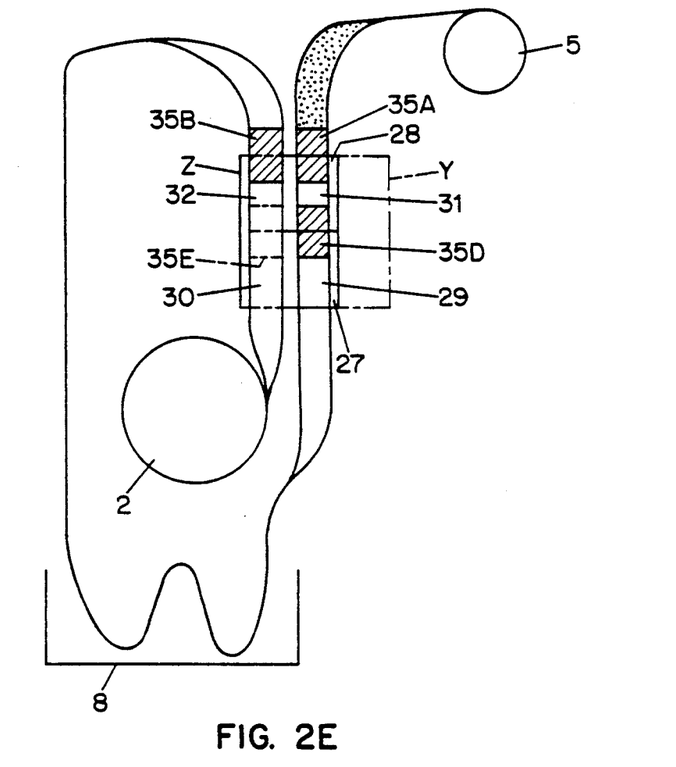

Now a description will be given of the procedure for reuse of the magnetic tape 3 by rewinding it around the first reel means 2 and introducing the leader tape 6 into the loop bin 8 again. First, the running of the endless-loop magnetic tape 3 is brought to a halt. In particular, the running is halted in response to the output signal of the detection mechanisms 42 and 43 in such a manner that the above-mentioned splice, namely the segment 35B, is brought to the position 35C represented by a broken line in FIG. 2D. This function is required when reusing the endless-loop magnetic tape 3 after rewinding it around the first reel means 2. With repetition of such reuse, the magnetic tape 3 is gradually shortened in length, but this is preferable to the other possibility, which is the accumulation of a multiplicity of spliced portions in the vicinity of the front and rear end of the magnetic tape 3. After the running of the magnetic tape 3 is halted at the above position, suction is turned on in the guide grooves 29 and 32. The cutter blade 24 is then actuated to cut and separate the front and rear ends of the magnetic tape 3 from each other. Thereafter the slide guide 28 is shifted to the position Z so that the guide grooves 29 and 31 are aligned with each other as illustrated in FIG. 2E. Next, the end of the magnetic tape 3 in the guide groove 29 is spliced to the end of the magnetic tape 3 in the guide groove 31 by using a segment 35D of the adhesive tape. Subsequently the slide guides 27 and 28 are shifted simultaneously to the position Y with the respective guide grooves maintained in mutual alignment, and the two ends of the magnetic tape 2 held in the guide grooves 30 and 32 are spliced to each other by another segment 35E of the adhesive tape shown by a dotted line. The looping path in this state becomes the same as the one illustrated in FIG. 2B. Then the magnetic tape 3 is withdrawn from the loop bin 8 by the first reel means 2, while the leader tape 6 is fed into the loop bin 8 by the second reel means 5. For this operation, the capstan 40 and the pinch roller 41 are actuated. In reusing the magnetic tape 3, it is necessary to vary the splicing point of the magnetic tape 3 to the leader tape 6 in each reuse, and therefore the splicing point is offset from the cutting position by employment of the detection mechanisms 42 and 43 as mentioned previously. Consequently, the magnetic tape 3 is gradually shortened in accordance with repetition of such reuse.

Figure 3:
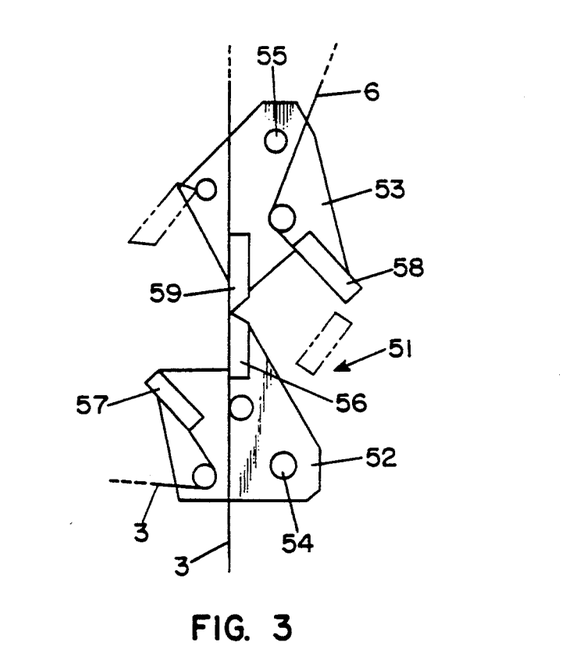
FIG. 3 is a front view of principal component means in another embodiment of the present invention.

Although the exemplary embodiment of the present invention has been described in detail hereinabove, it is to be understood that modifications may be made within the scope of the inventive concept. For example, if the magnetic tape 3 to be employed is very wide, the direction of operation of the splicing means 2, which is perpendicular to the panel base 13 in the aforementioned embodiment, may instead be parallel with the panel base 13 as illustrated in FIG. 3. The example of FIG. 3 is in the state corresponding to FIG. 2A, wherein the splicing means 51 consists of rotary bases 52 and 53 which are rotatable substantially through 90 degrees on axes 54 and 55 respectively each of which axes is perpendicular to the panel base 13. The rotary base 52 has guide grooves 56 and 57, while the other rotary base 53 has guide grooves 58 and 59. Such guide grooves 56, 57, 58 and 59 correspond respectively to the aforementioned guide grooves 29, 30, 31 and 32 illustrated in FIG. 2A and are functionally equal thereto. In this structure, the rotary bases 52 and 53 are so rotatable that the guide grooves 56, 57 and 58, 59 are selectively combined with each other. The splicing means 51 performs its operation in such a manner as to combine only one set of guide grooves at a time. Accordingly, the step of introducing the magnetic tape 3 into the loop bin 8, and the step of withdrawing the leader tape 6 from the loop bin 8 are carried out one after the other, rather than simultaneously. With the mechanism of FIG. 3, the tape is flexed only in the direction of its thickness, which is advantageous as compared to the shear forces which the tape may be subjected to with the movements of the guide grooves 29–32.

Although the splicing means shown in FIG. 2A and others is so composed as to hold the magnetic tape 3 and the leader tape 6 by utilizing suction (a negative pressure), the same result is achievable by using a loop holding mechanism which presses the tape directly into the guide grooves 29, 30, 31 and 32. While the leader tape housing means is shown as a reel means 5, one could instead employ merely in a box-shaped receptacle particularly if the leader tape 6 is short. When such a receptable is substituted for the reel, a capstan and a pinch roller are advantageously positioned at the inlet of the receptacle for manipulating the leader tape 6. In another variation of the disclosed embodiments, the loop bin 8 employed as the loop housing means may be furnished with a multiplicity of tape guide members for guiding the magnetic tape 3.

As described in detail hereinabove, when the tape transport apparatus and the tape introduction method of the present invention are used, the starting (front) end and the terminal (rear) end of a magnetic tape can be automatically spliced to each other by a splicing means, and the magnetic tape may thus be formed into an endless loop without any direct contact of the operator's fingers with the magnetic tape.

What is claimed is:

1. In a tape transport apparatus for manipulating leader tape and magnetic tape and for bidirectionally utilizing an endless-loop magnetic tape, wherein said tape transport apparatus comprises:

a loop-housing means for housing a variable length of tape and having first and second openings whereby tape may enter and exit said loop-housing means, the region between said two openings defining a tape handling path, said loop-housing means and said tape handling path defining a loop path for an endless-loop magnetic tape;

first guide means, splicing means, and second guide means disposed along the tape handling path between the said two openings, said first and second guide means disposed respectively toward said first and second openings;

tape transport means disposed along the tape handling path for running tape at one of said two openings in a first direction and in the opposite direction, and for running tape at the other of said two openings in a first direction and in the opposite direction;

said first guide means having a first position and a second position, said positions respectively guiding to the splicing means either tape from a reel means or tape from said first opening, said reel means capable of controllably supplying additional magnetic tape to said loop path and of controllably withdrawing magnetic tape from said loop path;

said second guide means having a first position and a second position, said positions respectively guiding to the splicing means either tape from said second opening or tape from a leader-tape housing means, said leader-tape housing means capable of controllably supplying leader tape to said loop path and of controllably withdrawing leader tape from said loop path;

said splicing means embracing the tape handling path between said first and second guide means, for cutting the tape guided to it by the said first and second guide means, and for splicing the tape guided to it by the said first and second guide means;

and wherein leader tape from the leader-tape housing means has initially been directed from the leader-tape housing means, through the second guide means, through the splicing means, through the first guide means, through the first opening of the loop-housing means, through the loop-housing means, through the second opening of the loop-housing means, and through the second guide means, and wherein magnetic tape from the reel means has initially been directed to the first guide means, said first and second guide means being in said first and first positions respectively, whereby an end of the magnetic tape from the reel means and an end of the leader tape are juxtaposed;

the method for establishing an endless loop of magnetic tape comprising the steps of:

actuating the splicing means so as to cut and splice the juxtaposed ends;

actuating the leader-tape housing means, the reel means, and the tape transport means to withdraw the leader tape from the first opening of the loop-housing means and to introduce a selected length of magnetic tape into the second opening of the loop-housing means;

actuating the splicing means so as to cut the magnetic tape between the reel means and the second opening of the loop-housing means and the magnetic tape between the first opening of the loop-housing means and the leader-tape housing means;

placing the first guide means in said second position, whereby ends of the magnetic tape from the loop-holding means are juxtaposed; and actuating the splicing means so as to splice the juxtaposed ends;

whereby an endless loop of magnetic tape of said selected length is established in the loop path.

2. In a tape transport apparatus for manipulating leader tape and magnetic tape and for bidirectionally utilizing an endless-loop magnetic tape, said tape transport apparatus comprising:

a loop-housing means for housing a variable length of tape and having first and second openings whereby tape may enter and exit said loop-housing means, the region between said two openings defining a tape handling path, said loop-housing means and said tape handling path defining a loop path for an endless-loop magnetic tape;

first guide means, splicing means, and second guide means disposed along the tape handling path between the said two openings, said first and second guide means disposed respectively toward said first and second openings;

tape transport means disposed along the tape handling path for running tape at one of said two openings in a first direction and in the opposite direction, and for running tape at the other of said two openings in a first direction and in the opposite direction;

said first guide means having a first position and a second position, said positions respectively guiding to the splicing means either tape from a reel means or tape from said first opening, said reel means capable of controllably supplying additional magnetic tape to said loop path and of controllably withdrawing magnetic tape from said loop path;

said second guide means having a first position and a second position, said positions respectively guiding to the splicing means either tape from said second opening or tape from a leader-tape housing means, said leader-tape housing means capable of controllably supplying leader tape to said loop path and of controllably withdrawing leader tape from said loop path;

said splicing means embracing the tape handling path between said first and second guide means, for cutting the tape guided to it by the said first and second guide means, and for splicing the tape guided to it by the said first and second guide means;

and wherein an endless loop of magnetic tape has initially been established along the loop path, said first and second guide means being in said second and first positions respectively;

the method for reusing the magnetic tape in said endless loop of magnetic tape comprising the steps of:

bringing to a halt the running of the endless loop of magnetic tape;

actuating the splicing means so as to cut the magnetic tape in said endless loop;

placing the first and second guide means in said second and second positions respectively, whereby an end of the leader tape from the leader-tape housing means and an end of the magnetic tape from the loop-housing means through the first opening of the loop-housing means are juxtaposed;

actuating the splicing means so as to cut and splice the juxtaposed ends;

placing the first and second guide means in said first and first positions respectively, whereby an end of the magnetic tape from the reel means and an end of the magnetic tape from the loop-housing means through the second opening of the loop-housing means are juxtaposed;

actuating the splicing means so as to cut and splice the juxtaposed ends; and actuating the leader-tape housing means, the reel means, and the tape transport means to withdraw the magnetic tape from the second opening of the loop-housing means into the reel means and to introduce the leader tape into the first opening of the loop-housing means, stopping after the leader tape has reached the second guide means;

whereby leader tape from the leader-tape housing means is directed from the leader-tape housing means, through the second guide means, through the splicing means, through the first guide means, through the first opening of the loop-housing means, through the loop-housing means, through the second opening of the loop-housing means, and through the second guide means.

3. A tape transport apparatus for manipulating leader tape and magnetic tape and for bidirectionally utilizing an endless-loop magnetic tape, said tape transport apparatus comprising:

a loop-housing means for housing a variable length of tape and having first and second openings whereby tape may enter and exit said loop-housing means, the region between said two openings defining a tape handling path, said loop-housing means and said tape handling path defining a loop path for an endless-loop magnetic tape;

first guide means, splicing means, and second guide means disposed along the tape handling path between the said two openings, said first and second guide means disposed respectively toward said first and second openings;

tape transport means disposed along the tape handling path for running tape at one of said two openings in a first direction and in the opposite direction, and for running tape at the other of said two openings in a first direction and in the opposite direction;

said first guide means having a first position and a second position, said positions respectively guiding to the splicing means either tape from a reel means or tape from said first opening, said reel means capable of controllably supplying additional magnetic tape to said loop path and of controllably withdrawing magnetic tape from said loop path;

said second guide means having a first position and a second position, said positions respectively guiding to the splicing means either tape from said second opening or tape from a leader-tape housing means, said leader-tape housing means capable of controllably supplying leader tape to said loop path and of controllably withdrawing leader tape from said loop path;

said splicing means embracing the tape handling path between said first and second guide means, for cutting the tape guided to it by the said first and second guide means, and for splicing the tape guided to it by the said first and second guide means.

4. The tape transport apparatus of claim 3 further comprising read/write and erase heads along the tape handling path, whereby signals may be written to and read from an endless-loop magnetic tape.

5. The tape transport apparatus of claim 3 wherein said loop path lies substantially within a plane and the tape is along its width substantially perpendicular to said plane.

6. The tape transport apparatus of claim 5 wherein said first and second guide means each move between respective first and second positions by rotation about an axis substantially perpendicular to said plane.

7. The tape transport apparatus of claim 6 wherein said first guide means further comprises vacuum means for controllably holding said tape from said reel means and for controllably holding said tape from said first opening, and wherein said second guide means further comprises vacuum means for controllably holding said tape from said leader-tape housing means.

* * * * *

UNITED STATES PATENT AND TRADEMARK OFFICE
CERTIFICATE OF CORRECTION

PATENT NO.   :   5,066,347

DATED        :   November 19, 1991

INVENTOR(S)  :   HIROKAZU YOSHIDA

It is certified that error appears in the above-identified patent and that said Letters Patent is hereby corrected as shown below:

ABSTRACT, "operation" should read --any operation--;

Col. 1, line 22, "4,656,430" should read --4,656,530--;

Col. 2, line 34, "when the" should read --when--;

Col. 3, line 37, "maybe" should read --may be--;

Col. 4, line 13, "maybe" should read --may be--;

Col. 4, line 45, "through in" should read --through--;

Col. 4, line 55, "whereby, where" should read --whereby--;

Col. 5, line 8, "desired" should read --the desired--;

Col. 6, line 54, "in a" should read --a--

Signed and Sealed this

Fourteenth Day of September, 1993

Attest:

BRUCE LEHMAN

Attesting Officer

Commissioner of Patents and Trademarks